(12) United States Patent
Lee et al.

(10) Patent No.: US 7,749,660 B2
(45) Date of Patent: Jul. 6, 2010

(54) ELECTROLYTE FOR IMPROVING LIFE CHARACTERISTICS AT HIGH TEMPERATURE AND LITHIUM SECONDARY BATTERY COMPRISING THE SAME

(75) Inventors: Yun-Ho Lee, Daejeon (KR); Seungdon Choi, Daejeon (KR); Changjoo Han, Daejeon (KR); Jonghwan Kim, Daejeon (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 400 days.

(21) Appl. No.: 11/765,927

(22) Filed: Jun. 20, 2007

(65) Prior Publication Data
US 2007/0292754 A1  Dec. 20, 2007

(30) Foreign Application Priority Data
Jun. 20, 2006  (KR)  .................... 10-2006-0055621

(51) Int. Cl.
*H01M 10/056* (2010.01)
*H01N 4/505* (2010.01)

(52) U.S. Cl. .................. 429/325; 429/200; 429/224
(58) Field of Classification Search ................ 429/212, 429/224, 324, 326, 200, 325
See application file for complete search history.

(56) References Cited

U.S. PATENT DOCUMENTS

| 5,521,027 | A | | 5/1996 | Okuno et al. |
| 5,525,443 | A | | 6/1996 | Okuno et al. |
| 5,658,687 | A | * | 8/1997 | Takeda et al. ........... 429/212 X |
| 6,620,552 | B2 | * | 9/2003 | Kida et al. .............. 429/324 X |
| 6,929,788 | B2 | * | 8/2005 | Park et al. ............... 429/224 X |

FOREIGN PATENT DOCUMENTS

| JP | 2000123867 | 4/2000 |
| JP | 2000323169 | 11/2000 |
| JP | 2002025611 | 1/2002 |
| JP | 2002270230 | 9/2002 |

* cited by examiner

*Primary Examiner*—Stephen J. Kalafut
(74) *Attorney, Agent, or Firm*—Cantor Colburn LLP

(57) ABSTRACT

Provided is a battery electrolyte comprising an electrolyte salt, an electrolyte solvent and a compound producing chemical reaction products with the exception of water through a chemical reaction with an acid ($H^+$), and a secondary battery comprising the same. The battery electrolyte according to the present invention can achieve improved high-temperature storage characteristics and the life characteristics of the battery, by using a compound decreasing a concentration of HX (X=F, Cl, Br or I) through a chemical reaction with HX (X=F, Cl, Br or I) which is present in the battery and therefore causes deterioration of the battery performance.

15 Claims, No Drawings

ELECTROLYTE FOR IMPROVING LIFE CHARACTERISTICS AT HIGH TEMPERATURE AND LITHIUM SECONDARY BATTERY COMPRISING THE SAME

FIELD OF THE INVENTION

The present invention relates to a battery electrolyte for improving high-temperature life characteristics of a battery and a lithium secondary battery using the same. More specifically, the present invention relates to a battery electrolyte comprising an electrolyte salt, an electrolyte solvent and a compound producing chemical reaction products with the exception of water through a chemical reaction with an acid ($H^+$), and a lithium secondary battery having improved high-temperature performance via incorporation of the same electrolyte.

BACKGROUND OF THE INVENTION

Technological development and increased demand for mobile equipment have led to a rapid increase in the demand for secondary batteries as an energy source. Among other things, a great deal of research and study has been focused on lithium secondary batteries having high-energy density and high-discharge voltage. These lithium secondary batteries are also commercially available and widely used.

The lithium secondary battery uses a metal oxide such as $LiCoO_2$ as a cathode active material and a carbonaceous material as an anode active material, and is fabricated by disposition of a porous polymer separator between the anode and the cathode and addition of an organic electrolyte or polymer electrolyte containing a lithium salt such as $LiPF_6$. Upon charging, lithium ions deintercalate from the cathode active material and intercalate into a carbon layer of the anode. In contrast, upon discharging, lithium ions deintercalate from the carbon layer of the anode and intercalate into the cathode active material. Here, the electrolyte serves as a medium through which lithium ions migrate between the anode and the cathode. Electrical energy is generated by oxidation-reduction reaction upon intercalation-deintercalation of lithium ions into and from the anode and the cathode.

In such a lithium secondary battery, the life characteristics and high-temperature storage characteristics of the battery are essential requirements that the battery must have. The battery using a conventional cathode active material has a disadvantage in that water and a lithium salt, e.g. $LiPF_6$, present in electrodes or electrolytes, react to form a strong acid HF, which is accompanied by undesirable side reactions. That is, the thus-formed HF results in dissolution of cathode and anode active materials, thereby degradation of the electrode performance. In addition, HF leads to formation of lithium fluoride (LiF) on the cathode surface, consequently increasing electrical resistance, and gas evolution results in deterioration of the battery life. In particular, as a dissolution rate of the electrode materials caused by HF is increased at high temperatures, the formation of HF gives rise to significant problems associated with the battery cycle life and storage properties at high temperatures.

Further, when a cyclic carbonate having high polarity is used as an organic solvent of an electrolyte for the secondary battery, this may results in deterioration of the battery life characteristics due to an increased viscosity. To overcome such a disadvantage, U.S. Pat. Nos. 5,521,027 and 5,525,443 disclose a non-aqueous electrolyte of a linear carbonate having a low polarity but a low viscosity, mixed with a cyclic carbonate, in order to reduce the viscosity. Representative examples of the linear carbonates may include dimethyl carbonate (DMC), diethyl carbonate (DEC) and ethylmethyl carbonate (EMC). Among them, EMC having the lowest freezing point of −55° C. exerts superior low-temperature performance and life performance when it is used. As examples of the cyclic carbonates, mention may be made of ethylene carbonate (EC), propylene carbonate (PC) and butylene carbonate (BC). Inter alia, PC has a low freezing point of −49° C. and thus exerts good low-temperature performance. However, when graphitized carbon having a large volume is used as the anode, PC is highly reactive with the anode during a charging process, and therefore it is difficult to use large amounts of PC. For this reason, EC, which forms a stable protective film at the anode, is primarily used. However, it cannot be said that EC is completely free of reactivity and therefore decomposition of the electrolyte, which occurs at the anode and cathode during charging/discharging of the battery, is one of numerous causes that shorten the battery life. In particular, EC exhibits highly increased reactivity at high temperatures, thus resulting in various problems.

As an attempt to overcome such problems and thereby improve the battery life at room temperature and high temperature, Japanese Unexamined Patent Publication No. 2000-123867 discloses a battery in which small amounts of ester compounds (for example, vinylene carbonate) having a cyclic molecular structure and C=C unsaturated bonds within the ring were added to the electrolyte. It is believed that such additive compounds decompose at the anode or cathode and then form films on the surfaces of the electrodes, thereby inhibiting decomposition of the electrolyte. However, such additives also cannot completely prevent decomposition of the electrolyte.

In addition, Japanese Unexamined Patent Publication No. 2002-25611 discloses a battery in which ethylene sulfite and vinylene carbonate were added to the electrolyte, and Japanese Unexamined Patent Publication No. 2002-270230 discloses a battery in which various kinds of ethylene sulfite compounds were added to the electrolyte. However, it was also confirmed that those additives disclosed in the above-mentioned prior arts did not exert a desired degree of effects.

Further, Japanese Unexamined Patent Publication No. 2000-323169 discloses a battery comprising an electrolyte with incorporation of a benzoic ester wherein hydrogen atoms of a benzene ring are substituted with one or more fluoro or trifluoromethyl groups. However, the additives disclosed in the above Japanese Patent are very expensive resulting in increased production costs of the battery and do not provide improvement of high-temperature characteristics to a desired degree. That is, since the electrolyte decomposition due to the graphitized carbon of anode is further accelerated at high temperatures, such additives cannot provide excellent improvement of high-temperature characteristics when the battery using those additives is used as a power source for devices requiring high-temperature operation, for example electric vehicles (EVs) and hybrid electric vehicles (HEVs).

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that upon the use of an electrolyte containing a compound producing organic materials with the exception of water through a chemical reaction with HX (X=F, Cl, Br or I) that causes deterioration of the battery performance, it is possible to improve the life characteristics and high-temperature storage characteristics of the battery by preventing degradation of cathode/anode active materials due to HX (X=F, Cl, Br or I), for example HF, and the consequent reduction of the battery life. The present invention has been completed based on these findings.

DETAILED DESCRIPTION OF PREFERRED EMBODIMENTS

In accordance with an aspect of the present invention, the above and other objects can be accomplished by the provision of a battery electrolyte comprising (a) an electrolyte salt, (b) an electrolyte solvent and (c) a compound producing chemical reaction products with the exception of water through a chemical reaction with an acid ($H^+$).

A lithium-containing halide such as lithium-containing fluoride, lithium-containing chloride, or the like, which is used as the electrolyte salt in the battery electrolyte, reacts with a small amount of water present in the battery to thereby form a strong acid. The formation of such an acid ($H^+$) is essentially accompanied by undesirable side reactions as discussed before, when it is present in the battery.

Therefore, the present invention is configured to minimize adverse side reactions which may occur due to the presence of acid ($H^+$), by using as an electrolyte additive or an electrode additive a compound capable of decreasing a concentration of the acid ($H^+$) which leads to increased acidity (decreased pH) of the electrolyte, dissolution of electrode active materials and a resistance increase of the electrodes and the consequent decrease of the battery life.

That is, if one of the components constituting the battery electrolyte according to the present invention is a compound producing chemical reaction products with the exception of water through a chemical reaction with an acid ($H^+$), such a compound can be used without particular limitation. In particular, the acid ($H^+$) may be HX (X=F, Cl, Br or I) which is formed by the reaction of (i) at least one electrolyte salt composed of a lithium-containing halide with (ii) water present in the battery.

1) The present invention provides a decreased concentration of HF in the battery as well as a fundamental solution to the deterioration of the battery performance caused by HX, via the use of an electrolyte additive that undergoes a spontaneous chemical reaction with HX present in the battery.

2) Further, the present invention can achieve a continuous decrease of the HX concentration through the reaction of the electrolyte salt with water as well as fundamental prevention of HX production reaction itself, by the constitution to ensure that organic materials with the exception of water are produced as the reaction products formed by the chemical reaction of the above-mentioned electrolyte additive with HX.

The compound (c) may be ionic salt compounds which are dissociable in aqueous or non-aqueous solvents. Preferably, the compound (c) may be a compound containing any conventional anion with the exception of a hydroxyl ($OH^-$) group producing water through the reaction with an acid ($H^+$).

There is no particular limit to the anion. Non-limiting examples of the anion may include benzoate, phthalate, malate, succinate, citrate and any combination thereof.

In one preferred embodiment of the present invention, the compound (c) is a benzoate compound represented by Formula I below:

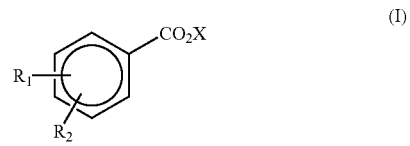

wherein each of $R_1$ and $R_2$ is each independently hydrogen, hydroxyl, halogen, carboxyl, amine, nitro, cyano, optionally substituted linear or cyclic alkyl, or optionally substituted aryl; and X is hydrogen, an alkali metal, an alkaline earth metal, a transition metal or ammonium. More preferably, in Formula I, each of $R_1$ and $R_2$ is each independently hydrogen, and X is an alkali metal or ammonium.

There is no particular limit to the chemical reaction that spontaneously take places between the compound (c) and HX (X=F, Cl, Br or I), including conventional chemical reactions well known in the art. Further, there is also no particular limit to the products of the chemical reaction with the exception of water. Preferred examples of the reaction products may include a benzoic acid, a phthalic acid, a maleic acid, a succinic acid and a citric acid. In addition, carboxylic acids (RCOOH), sulfonic acids ($RCO_3H$), sulfinic acids ($RSO_2H_4$), phenolic acids ($RCH=C(OH)R_1$), thiophenol (ArSH), imides (RCONHCOR), oxime (RCH=NOH), aromatic sulfone amides ($ArSO_2NH_2$, $ARSO_2NHR_1$), and primary and secondary intro compounds ($RCH_2NO_2$, $RCHNO_2$) also fall in the scope of the present invention.

The battery electrolyte according to the present invention is characterized in that a concentration of HX (X=F, Cl, Br or I) is decreased by chemical reaction with anions among compounds producing chemical reaction products with the exception of water through a chemical reaction of (i) HX (X=F, Cl, Br or I) present in the battery and (ii) an acid ($H^+$) contained in the electrolyte.

A remaining amount of HX (X=F, Cl, Br or I) in the electrolyte of the present invention, which will be decreased through the above chemical reaction, is preferably less than 50 ppm.

Further, acidity (pH) of the initial electrolyte where HX is present is generally maintained below 5, whereas the pH of electrolyte is increased to 5 or higher after a decrease of the HX concentration is achieved. The acidity (pH) of electrolyte according to the present invention may vary during the chemical reaction of the acid ($H^+$) in the battery with the compound (c) and may be preferably within the range of 2 to 6. The product such as benzoic acid liberates $H^+$ ions only above a pH of 7.0 or higher and therefore changes in the pH value due to the reaction product is insignificant.

The content of the compound (c) can be controlled taking into consideration all the performance of the battery to be improved, and is preferably in the range of 0.01 to 10 parts by weight, based on 100 parts by weight of the electrolyte. If the content of the compound (c) is lower than 0.01 parts by weight, this leads to insignificant improvement in the desired life characteristics and high-temperature storage characteristics. On the other hand, if the content of the compound (c) is higher than 10 parts by weight, this may result in various problems associated with decreased capacity of the battery, increased viscosity of the electrolyte and decreased ionic conductivity due to adverse side reactions of excess compounds.

The battery electrolyte with incorporation of the compound (c) contains conventional electrolyte components known in the art, for example an electrolyte salt and an organic solvent.

The electrolyte salt that can be used in the present invention is a salt having a structure of $A^+B^-$ wherein $A^+$ includes alkali metal cations such as $Li^+$, $Na^+$ and $K^+$ and any combination thereof, and $B^-$ includes anions such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, and any combination thereof. Particularly preferred is a lithium salt.

The organic solvent that can be used in the present invention may be a conventional solvent well-known in the art, preferably a cyclic carbonate and/or a linear carbonate. Examples of the organic solvent may include, but are not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxy ethane, diethoxy ethane, tetrahydrofuran, N-methyl-2-pyrolidone (NMP), ethylmethyl carbonate (EMC), gamma-butyro lactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate and any combination thereof. In addition to those compounds, halogen derivatives of the above organic solvents may also be utilized.

In accordance with another aspect of the present invention, there is provided an electrode comprising the compound (c).

The electrode may be configured to have a structure wherein the compound (c) is used as a component of the electrode material or is coated on a surface of the fabricated electrode. In addition to such an electrode structure, coating of the compound (c) may be formed on the surface of electrode active material during charge/discharge of the battery using the above-mentioned electrolyte.

In accordance with a further aspect of the present invention, there is provided a secondary battery comprising the above-mentioned electrolyte and electrode. In the secondary battery comprising a cathode, an anode, a separator and an electrolyte, the above-mentioned electrolyte may be composed of (a) an electrolyte salt, (b) an electrolyte solvent, and (c) a compound producing chemical reaction products with the exception of water through a chemical reaction with an acid ($H^+$). Preferably, the compound (c) is incorporated as an electrolyte additive. Additionally, either or both of the cathode and the anode may be an electrode comprising an electrode active material containing a compound producing chemical reaction products with the exception of water through a chemical reaction with an acid ($H^+$). In one preferred embodiment of the present invention, the secondary battery may be comprised of the electrolyte and/or electrode according to the present invention.

In particular, the dissolution of electrode active materials caused by HX (X=F, Cl, Br or I) generally leads to significant problems in lithium/manganese-based cathode active materials having a spinel structure. On the other hand, the secondary battery according to the present invention has effects of preventing the dissolution of cathode active material by induction of HX concentration decrease in the battery. As a result, lithium/manganese-based composite oxides may be advantageously employed without particular limitation, via the improvement of life characteristics in manganese-based cathode active materials. Therefore, the secondary battery according to the present invention is preferably a secondary battery comprising a lithium-containing manganese-based oxide having a spinel structure as the cathode active material.

The secondary battery may be various forms of repeatedly chargeable/dischargeable secondary batteries. Preferred is a lithium secondary battery. Non-limiting examples of the lithium secondary batteries may include lithium metal secondary batteries, lithium ion secondary batteries, lithium polymer secondary batteries and lithium ion polymer secondary batteries.

In this manner, the lithium secondary battery includes an electrode in which a compound producing chemical reaction products with the exception of water through a chemical reaction with an acid ($H^+$) is formed on a partial or entire surface of the electrode active material, or includes an electrode in which such a compound is formed on a partial or entire surface of the fabricated electrode. As a result, the dissolution of electrode active material due to HX (X=F, Cl, Br or I) and the degradation of electrode active material due to the dissolution of active material can be prevented, consequently preventing an increase of electrical resistance of the electrode and gas evolution, resulting in improved life characteristics of the battery. In particular, as a dissolution rate of the electrode materials caused by HF is increased at high temperatures, the formation of HF gives rise to significant problems associated with the battery cycle life and storage properties at high temperatures. However, the present invention provides a fundamental solution to the problems associated with the deterioration of the battery performance, via a decreased concentration of HF, and therefore enables improvements of high-temperature storage characteristics.

There is no particular limit to a method of fabricating the electrode of the present invention. In one embodiment, the electrode may be fabricated by a conventional method known in the art, for example by applying an electrode slurry containing a cathode active material or an anode active material to a current collector, followed by drying. Herein, small amounts of a conductive material and/or a binder may be optionally added to the electrode material.

The cathode active material may be a common cathode active material that can be used in the cathode for conventional secondary batteries. Examples of the cathode active material may include, but are not limited to, lithium transition metal composite oxides of Formula $LiM_xO_y$ (M=Co, Ni, Mn, or $Co_aNi_bMn_c$) (for example, lithium/manganese composite oxides including $LiMn_2O_4$; lithium/nickel oxides including $LiNiO_2$; lithium/cobalt oxides including $LiCoO_2$; and modifications of those oxides in which portions of manganese, nickel or cobalt are substituted with other transition metals, or lithium-containing vanadium oxides), and chalcogen compounds (for example, manganese dioxide, titanium disulfide, molybdenum disulfide, and the like). Preferred are $LiCoO_2$, $LiNiO_2$, $LiMnO_2$, $LiMn_2O_4$, $Li(Ni_aCO_bMn_c)O_2$ ($0<a<1$, $0<b<1$, $0<c<1$, and $a+b+c=1$), $LiNi_{1-y}Co_yO_2$, $LiCo_{1-y}Co_yO_2$, $LiCo_{1-y}Mn_yO_2$, $LiNi_{1-y}Mn_yO_2$ ($0<y<1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ ($0<z<2$), $LiCoPO_4$, $LiFePO_4$ and a mixture thereof.

The anode active material may be a common anode active material that can be used in the anode for conventional secondary batteries. Examples of the anode active material may include, but are not limited to, lithium-adsorbing materials such as lithium metals or lithium alloys, carbon, petroleum coke, activated carbon, graphite and other carbons. Examples of the cathode current collector include, but are not limited to, foils made of aluminum, nickel and any combination thereof. Examples of the anode current collector include, but are not limited to, foils made of copper, gold, nickel, copper alloys and any combination thereof.

The binder that can be used in the present invention may be a conventional one known in the art. Examples of the binder may include, but are not limited to, polyvinylidene fluoride (PVDF) and styrene butadiene rubber (SBR).

Further, the secondary battery according to the present invention can be fabricated according to any conventional method known in the art, by disposing a porous separator between the cathode and the anode and introducing the electrolyte into the resulting electrode assembly.

There is no particular limit to the separator that can be used in the present invention, as long as it is made of a porous material. Specific examples of the porous separator may preferably include, but are not limited to, polypropylene series, polyethylene series, and polyolefin series. Further, the porous separator with incorporation of inorganic particles may also be used.

The external shape of the thus-fabricated secondary battery is not limited to any specific shape, but may be a cylindrical shape with a can, a prismatic shape, a pouch shape, or a coin shape.

In accordance with yet another aspect of the present invention, there is provided a HX (X=F, Cl, Br or I)-reducing agent for a battery, comprising the compound (c) which is a compound producing chemical reaction products with the exception of water through the chemical reaction with HX (X=F, Cl, Br or I); and a method for improving the life characteristics of a secondary battery by incorporation of the compound (c) into the battery.

EXAMPLES

Now, the present invention will be described in more detail with reference to the following examples. These examples are provided only for illustrating the present invention and should not be construed as limiting the scope and spirit of the present invention.

Example 1

1-1. Preparation of Electrolyte 1 part by weight of ammonium benzoate was added to a solution of 1M $LiPF_6$ in EC/EMC/DEC as an electrolyte to thereby prepare an electrolyte.

1-2. Fabrication of Lithium Secondary Battery

Fabrication of Cathode $LiMn_2O_4$ as a cathode active material, a conductive material and a binder were added to N-methyl-2-pyrrolidone (NMP) as a solvent to thereby prepare a cathode slurry. Thereafter, the resulting cathode slurry was coated on an aluminum (Al) current collector to fabricate a cathode.

Fabrication of Anode

A mixture of artificial graphite and amorphous carbon (hard carbon) as an anode active material, and a binder were added to NMP to thereby prepare an anode slurry. Thereafter, the resulting anode slurry was coated on a copper current collector to fabricate an anode.

Fabrication of Battery

A polyolefin separator was disposed between the thus-fabricated cathode and anode, and an electrolyte was injected into the resulting electrode assembly to thereby fabricate a battery.

Comparative Example 1

A lithium secondary battery was fabricated in the same manner as in Example 1, except that ammonium benzoate was not added to an electrolyte.

Experimental Example 1

Comparison and Evaluation of HF Concentrations Between Electrolytes

In order to evaluate changes in a HF concentration of an electrolyte to which ammonium benzoate was added according to the present invention, the following experiment was carried out.

For lithium secondary batteries fabricated in Example 1 and Comparative Example 1, an initial acidity (pH) of each electrolyte was measured. Thereafter, the electrolytes were exposed to the atmosphere at room temperature for one month and changes of the acidity (pH) were measured again.

TABLE 1

|  | Example 1 | Comp. Example 1 |
| --- | --- | --- |
| Initial remaining HF (ppm) | 20-30 | |
| pH after 1 month | 5.18 | 3.33 |
| Remaining HF (ppm) | 23.59 | 2001.83 |

Experimental results thus obtained are given in Table 1 above. Referring to Table 1, it was confirmed that the secondary battery electrolyte according to the present invention exhibits decreased initial acidity (increased pH value) and remarkably superior HF concentration-lowering effects on amounts of HF in the room-temperature stored electrolyte, as compared to the battery electrolyte of Comparative Example 1 with no addition of ammonium benzoate. These results demonstrate that chemical reaction between HF and the ammonium benzoate incorporated into the electrolyte leads to a significant decrease in a HF concentration and such effects are continuously maintained.

Experimental Example 2

Performance Evaluation of Lithium Secondary Battery

In order to evaluate high-temperature performance of the lithium secondary battery according to the present invention, the following experiment was carried out.

Lithium secondary batteries fabricated in Example 1 and Comparative Example 1 were charged in a region of 4.2 to 3V at a charge current of 0.5 C, and the initial capacity was measured. Thereafter, the batteries were stored at 60° C. for two weeks, and charge/discharge was repeated in a region of 4.2 to 3V at a charge/discharge current of 0.5 C to measure % power retention of the batteries.

TABLE 2

|  | Example 1 | Comp. Example 1 |
| --- | --- | --- |
| Discharge power retention (%) | 95.4 | 92.4 |

From the experimental results, it was confirmed that the battery of Example exhibits remarkably high power retention after high-temperature storage, as compared to the battery of Comparative Example 1 including a conventional electrolyte (see Table 2). This indicates that the addition of ammonium benzoate to the electrolyte leads to a decreased concentration of HF in the battery, which consequently results in prevention of dissolution of electrode active materials, decreased resistance of the electrode and thereby improved the life characteristics of the battery.

Experimental Example 3

Evaluation of Long-Term Storage Characteristics of Lithium Secondary Battery

In order to evaluate high-temperature performance of the lithium secondary battery with respect to varying contents of ammonium benzoate in the electrolyte, the following experiment was carried out.

First, lithium secondary batteries with varying contents of ammonium benzoate in the electrolyte were fabricated in the same manner as in Example 1. The thus-fabricated batteries were charged in a region of 4.2 to 3V at a charge current of 0.5 C, and the initial capacity was measured. Thereafter, the batteries were stored at room temperature for four weeks, and charge/discharge was repeated in a region of 4.2 to 3V at a charge/discharge current of 0.5 C to measure long-term storage characteristics of the battery.

TABLE 3

| Content of ammonium benzoate in electrolyte | Storage characteristics of battery after 4 weeks (% capacity retention) |
| --- | --- |
| 0.1 wt % | 97.42 |
| Filtering after excess dissolution (ca. 0.05 wt %) | 97.50 |
| 0.02 wt % | 96.87 |
| X | 94.35 |

Similar to previous Experimental Examples, it was confirmed that the lithium secondary battery with addition of ammonium benzoate to the electrolyte exhibits excellent long-term storage characteristics, as compared to the secondary battery with no treatment of ammonium benzoate. In particular, it can be seen that an increasing content of ammonium benzoate within a specified range leads to further improvements in long-term storage characteristics of the battery (see Table 3).

INDUSTRIAL APPLICABILITY

As apparent from the above description, a battery electrolyte according to the present invention and a secondary battery comprising the same can achieve improved life characteristics and high-temperature storage characteristics of the battery, by decreasing a concentration of HX (X=F, Cl, Br or I) through a chemical reaction of a certain compound with HX.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery, comprising:
a cathode, an anode, an electrolyte and a separator, wherein the electrolyte comprises
(a) an electrolyte salt;
(b) an electrolyte solvent; and
(c) a compound producing chemical reaction products other than water when added to an acid, wherein
the acid is represented by the Formula HX, wherein X is F, Cl, Br or I,
the acid is formed from the electrolyte salt, which includes a lithium containing halide, and water, which is present in the secondary battery, and
the cathode comprises a cathode active material, the cathode active material comprising a lithium-containing manganese-based oxide having a spinel structure.

2. The secondary battery according to claim 1, wherein the compound (c) is an ionic salt compound.

3. The secondary battery according to claim 1, wherein the compound (c) contains an anion other than a hydroxyl (OH$^-$) group.

4. The secondary battery according to claim 3, wherein the anion is at least one selected from the group consisting of benzoate, phthalate, maleate, succinate, citrate and any combination thereof.

5. The secondary battery according to claim 3, wherein the compound (c) is a benzoate compound represented by Formula I:

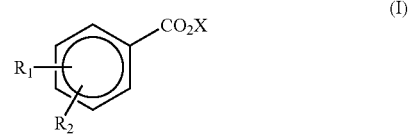

wherein each of $R_1$ and $R_2$ is each independently hydrogen, hydroxyl, halogen, carboxyl, amine, nitro, cyano, optionally substituted linear or cyclic alkyl, or optionally substituted aryl; and X is hydrogen, an alkali metal, an alkaline earth metal, a transition metal or ammonium.

6. The secondary battery according to claim 1, wherein a concentration of the acid having the Formula HX is decreased by a chemical reaction with anions to produce chemical reaction products other than water through a chemical reaction of (i) the acid of the Formula HX, which is present in the battery, and (ii) an acid contained in the electrolyte.

7. The secondary battery according to claim 1, wherein a remaining amount of HX in the electrolyte is less than 50 ppm.

8. The secondary battery according to claim 1, wherein the acidity (pH) of electrolyte is in the range of 2 to 6.

9. The secondary battery according to claim 1, wherein the content of the compound (c) is in the range of 0.01 to 10 parts by weight, based on 100 parts by weight of the electrolyte.

10. The secondary battery according to claim 1, wherein dissolution of the cathode active material is prevented via a decrease in a concentration of the acid having the Formula HX, which is present in the battery.

11. The secondary battery according to claim 1, wherein the battery is a lithium secondary battery.

12. A method for improving the life characteristics of a secondary battery, the method comprising:

including a compound in a secondary battery, wherein the compound, when added to an acid having the Formula HX produces a product other than water, wherein X is F, Cl, Br or I.

13. The secondary battery according to claim 1, wherein the battery includes an electrode comprising a compound (c), which, when added to an acid, produces chemical reaction products other than water.

14. The secondary battery according to claim 13, wherein dissolution of the cathode active material is prevented via a decrease in a concentration of the acid having the Formula HX, which is present in the battery.

15. The secondary battery according to claim 13, wherein the battery is a lithium secondary battery.

* * * * *